March 19, 1963 H. P. DEGERNESS 3,082,040
AUXILIARY TRACTION WHEELS FOR TRACTORS
Filed Feb. 16, 1961

INVENTOR.
HOWARD P. DEGERNESS
BY
Moore, White & Burd
ATTORNEYS

United States Patent Office 3,082,040
Patented Mar. 19, 1963

3,082,040
AUXILIARY TRACTION WHEELS FOR TRACTORS
Howard P. Degerness, Box 740, Roseau, Minn.
Filed Feb. 16, 1961, Ser. No. 89,705
2 Claims. (Cl. 301—36)

This invention relates to new and useful improvements in traction wheels for tractors, and more particularly to an attachment for such wheels whereby the effective tread of the tractor wheel may be increased to improve the traction effort of the wheel, and to permit the tractor to be driven over relatively soft ground and through deep snow without danger of becoming mired therein.

Numerous attempts have heretofore been made to improve the effective traction of a tractor wheel such as increasing the width or face of the tractor wheel by securing an auxiliary tire supporting rim to each traction wheel, thereby to increase the effective ground engaging surface of the tractor wheel. These attempts have not proven entirely satisfactory because of the complexity of the means provided for securing the auxiliary wheels to the tractor wheels and to permit their quick removal.

It is therefore an important object of the present invention to provide an auxiliary traction wheel for tractors, and the like, having means for readily and quickly attaching it to a conventional tractor wheel, when necessary, to increase the effective ground engaging surface of the tractor wheel, and which may as readily be detached therefrom, when no longer required.

A further object of the invention is to provide an auxiliary traction wheel for a tractor wheel comprising a tire supporting rim and tire, preferably of the same size as the tractor wheel rim and tire, whereby the auxiliary tire is interchangeable with the tire on the tractor wheel.

A further object is to provide an attaching means for securing an auxiliary tractor wheel to the usual traction wheel of a tractor, including an annular cylindrical collar or spacing member adapted to be interposed between the outer side face of the tractor wheel and the auxiliary wheel, thereby to space the two wheels apart and at the same time axially align the two wheels, and a plurality of longitudinally adjustable coupling members having means for securing their opposite ends to the tractor wheel and the auxiliary traction wheel, respectively, in such manner that the two wheels and the spacing collar may be drawn firmly together, whereby each auxiliary traction wheel becomes, in effect, an integral part of its respective tractor wheel.

Other objects of the invention reside in the specific construction of the elongated coupling members and the means for attaching them to the tractor and to the auxiliary wheel rims; and in the provision of an auxiliary tractor wheel which is extremely simple and inexpensive in construction, and is so designed that it may readily be attached to a tractor wheel by an inexperienced person without the use of special tools, etc.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
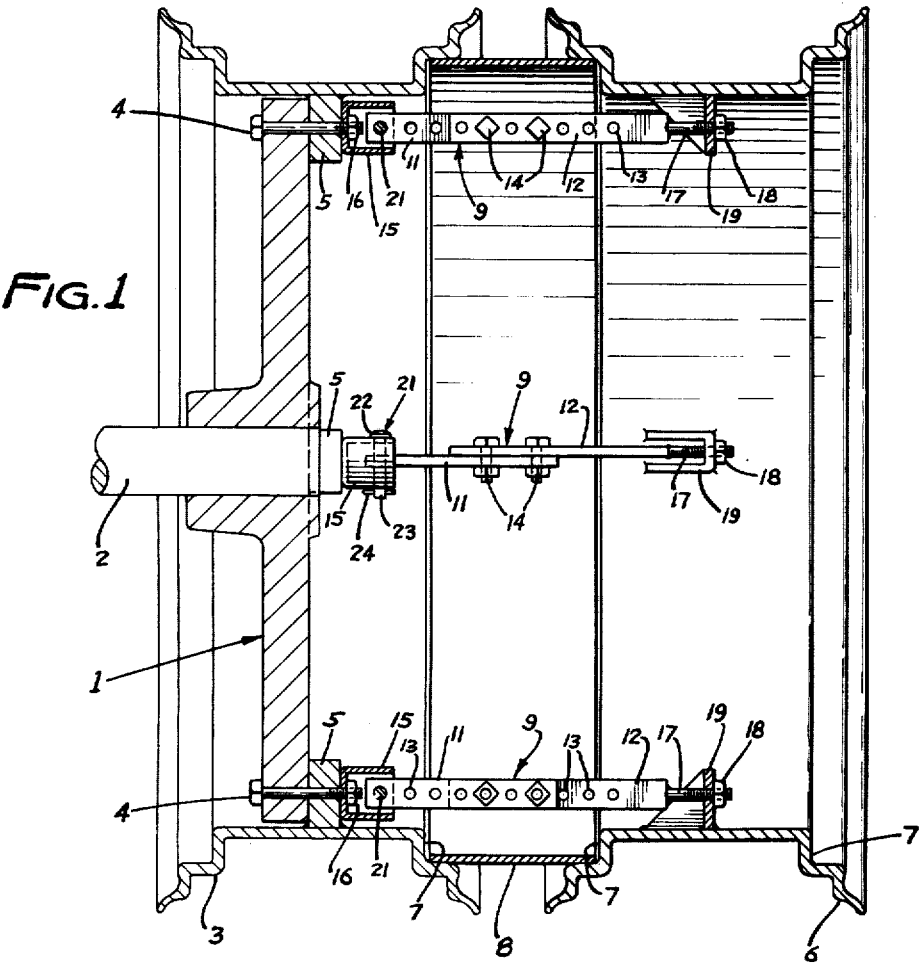
FIGURE 1 is a sectional elevational view of a tractor wheel showing the auxiliary traction wheel attached thereto.

In the selected embodiment of the invention herein disclosed, there is illustrated in FIGURE 1, for purposes of disclosure, a conventional tractor wheel, generally designated by the numeral 1. The wheel is shown mounted upon the usual drive axle 2, and has the usual tire supporting rim 3 secured thereto by such means as bolts 4, received in aligned apertures provided in the wheel and in a series of lugs or an annular flange 5 secured to the rim 3 by such means as welding.

Figure 2:
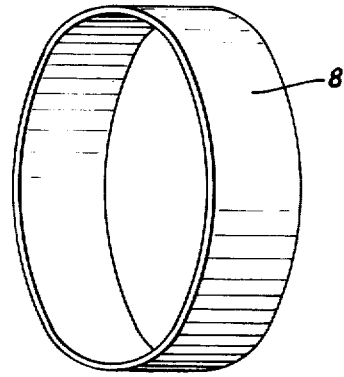
FIGURE 2 is a perspective view of the spacing collar inserted between the tractor and auxiliary wheel rims.

An important feature of the present invention resides in the provision of an auxiliary traction wheel including a tire supporting rim 6 adapted to support an auxiliary tire, not shown in the drawing. The tire supporting rim 6 of the auxiliary traction wheel is preferably identical in cross-sectional shape and diameter to the regular tractor tire rim 3, whereby tires of identical size may be used on the two rims. It will also be noted that rims 3 and 6 are provided in their opposite side faces with annular recesses 7. An annular cylindrical spacing collar or member 8, best shown in FIGURE 2, is interposed between the two rims to laterally space them apart, as shown in FIGURE 1.

The means provided for detachably securing the auxiliary rim 6 to the tractor wheel rim 3, constitutes an important feature of the present invention. Such means comprises a plurality of elongated coupling members generally designated by the numeral 9. Each coupling member comprises two sections 11 and 12, each provided with a plurality of longitudinally spaced apertures 13 for receiving bolts 14, as shown in FIGURE 1, to secure sections 11 and 12 in longitudinally adjusted positions, as will be understood by reference to FIGURE 1.

A plurality of coupling elements 15 may be permanently secured to the tractor wheel 1 by means of the bolts 4 which secure the rim 3 thereto. Coupling elements 15 are preferably cup-shaped in configuration and each has an aperture in its bottom wall for receiving the threaded end portions of bolts 4. Nuts 16 are secured to the bolts 4 within the coupling elements 15 to fixedly secure them to the tractor wheel. Coupling elements 15, when once secured to the tractor wheel, need not be removed therefrom when attaching or detaching the auxiliary tire rim 6 to the tractor wheel. If desired, the cup-shaped elements 15 may be otherwise shaped, without departing from the scope of the invention.

Figure 3:
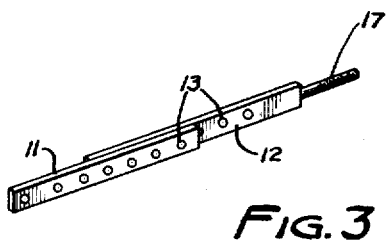
FIGURE 3 is a perspective view of one of the elongated coupling or tie members for detachably securing the auxiliary wheel to the tractor wheel.

The reduced outwardly directed end portions 17 of coupling member 12 are threaded as shown in FIGURE 3, to receive nuts 18 for securing them to a plurality of U-shaped lugs 19, welded to the inner cylindrical surface of the auxiliary rim 6, as clearly illustrated in FIGURE 1. The inner ends of the elongated coupling members 9 are attached to the cup-shaped mounting elements 15 by bolts or pins 21, each having a head 22 at one end and having their opposite ends 23 apertured to receive cotter pins 24, as will be understood by reference to FIGURE 1.

To initially secure the auxiliary traction wheels to their respective tractor wheels 1, the cup-shaped coupling elements 15 are first secured to the tractor wheels by manipulation of the nuts 16, as will be understood by reference to FIGURE 1. A cylindrical spacing collar or member 8 is then seated in the annular recesses 7 of one of the tractor wheels. If desired, the spacing collars or members 8 may be spot welded to their respective wheel rims 6 to facilitate mounting and demounting the auxiliary wheels.

The elongated coupling members 9 are then adjusted to the proper length by manipulation of bolts 14, as will be understood by reference to the drawing, and the inner ends of coupling sections 11 connected to their respective coupling elements 15 by insertion of pins 21 and cotter pins 24. The opposite reduced threaded end portions 17 of coupling member 9 may then be inserted into the apertures provided in the anchor lugs 19. Thereafter the nuts 18 are applied to the threaded end portions 17 of coupling member 9 and tightened to firmly draw the two wheel rims and spacing collars 8 together as a unit, as will be understood by reference to FIGURE 1. The nuts 18 for securing the auxiliary tire rims to their respective tractor wheel rims are readily accessible from the outer side of the auxiliary wheel. They may be readily manipulated by conventional tools in the operation of mounting the auxiliary wheel rims on the tractor wheels, or removing them therefrom.

When the auxiliary traction rims with tires mounted thereon are secured to the tractor wheels, as above described, the ground engaging areas of the two tractor wheels is increased to twice the size of the area normally engaged by the tractor wheels only. Thus, greater traction effort is obtained, and the tires may be operated with less pressure whereby the tractor will ride smoother and with less bouncing and shaking, as compared to the usual single tread tires. Also by using dual tires as herein disclosed, there is less slippage of the traction wheels with a resultant saving in power and fuel consumption.

As hereinbefore state, an important feature of the present invention resides in the simplified construction of the means for securing the auxiliary traction wheels to the tractor wheels, whereby the operation of thus securing the auxiliary traction wheels to the tractor wheels or removing them therefrom may be accomplished in a comparatively short interval of time. When the auxiliary traction wheels are to be detached from the tractor wheels, the nuts 18 are loosened sufficiently to free the pins 21 at the inner ends of the coupling members 9. The cotter pins 24 may then be removed from pins 21 whereby pins 21 may readily be withdrawn to free the inner ends of the coupling members from the tractor wheels. The auxiliary wheels may then be detached from the tractor wheels. If desired, the coupling members 9 may remain attached to the auxiliary traction wheels when said wheels are detached for storage, as the spacing collars or members 8 are preferably fixedly secured to their respective wheel rims, as hereinbefore stated. The auxiliary traction wheels and spacing collars 8, when detached from the tractor may be stacked one upon another to economize in storage space.

It is apparent that many modifications and variations of the invention as hereinbefore set forth may be made without departing from the spirit and scope thereof. The specific embodiments described are given by way of example only and the invention is limited only by the terms of the appended claims.

I claim as my invention:

1. The combination with a tractor wheel comprising a tire supporting rim having lug bolts, a pneumatic tire mounted thereon, said rim having an annular outwardly facing seat in its outer edge defined by an annular cylindrical wall, a cylindrical spacing collar having its inner side edge for receiving the outer side edge of said cylinwall, an auxiliary tire rim having an annular seat in one side edge for receiving teh outer side edge of said cylindrical spacing collar, a plurality of cup-shaped elements having holes in their bottoms and aligned holes in their side walls embracing the ends of at least some of said lug bolts with their bottom holes and secured thereon by nuts on said lug bolts engaging the inside bottom of said cup-shaped elements, a plurality of U-shaped brackets having legs and pierced bottoms secured to said auxiliary rim in positions corresponding to the embraced lugs on said tire rim and with the pierced bottoms of said U-shaped brackets positioned more remotely from said annular seat than said legs, elongated coupling members having a hole in one end and a threaded portion at the other, each positioned with the end having a hole inside said cup-shaped members and the threaded portion extending through the pierced bottom of one of said U-shaped members, fasteners extending through the aligned side wall holes in said cup members and the holes in one end of said elongated coupling members, and nuts threadably engaging said elongated coupling members threaded portions and when tightened engaging the bottom of said U-shaped brackets to draw said rim and auxiliary rim into intimate engagement with said cylindrical spacing collar.

2. An auxiliary wheel for use with a vehicle wheel having lug bolts and nuts and a rim, said auxiliary wheel comprising, a rim similar in configuration with said wheel rim with which the auxiliary wheel is to be used, an annular seat extending around each of said rims, a cylindrical spacing collar of a size to match said annular seat, a plurality of bracket members secured to said auxiliary rim in the same spacing as the lug bolts and nuts of a wheel with which said auxiliary rim is to be used, said brackets presenting pierced, radially extending faces, elongated members including threaded portions at one of their ends, said threaded portions extending through the pierced, radially extending faces of said brackets, nuts threadably engaging said threaded portions, said elongated members being longer than the distance from a lug bolt and nut of a wheel with which said auxiliary rim is to be used to said bracket face when said cylindrical spacing collar is in engagement with a wheel rim and said auxiliary rim, a hole in the end of said elongated member, a plurality of securing members having pierced bottoms and side walls extending at substantially right angles to said pierced bottom, aligned holes in said side walls, and a securing means longer than the distance from the outside of one side wall to the outside of the other side wall when said securing means is extending through said pierced holes, said securing means extending also through the hole in the end of said elongated member, whereby said means having pierced bottoms may be secured to the wheel lugs of a wheel and left there secured, and when it is desired to secure said auxiliary rim to said wheel rim, said auxiliary rim can be presented to said wheel rim with said cylindrical spacing collar therebetween, said elongated members having holes in their end extended between the aligned holes in the side walls of said members secured to said wheel lugs, said fastening means extended through said wheel lug mounted members and the nuts on said threaded members extending through said brackets on said auxiliary rim tightened and bearing on said radially extending faces of said brackets until said cylindrical spacing collar is in intimate engagement with opposed annular seats of said rim and auxiliary rim.

References Cited in the file of this patent

UNITED STATES PATENTS

| 935,176 | Thompson | Sept. 28, 1909 |
| 1,327,607 | Baker | Jan. 13, 1920 |
| 1,982,135 | Daddio | Nov. 22, 1934 |

FOREIGN PATENTS

| 448,052 | France | Nov. 15, 1912 |
| 37,481 | Norway | of 1913 |
| 186,127 | Switzerland | Feb. 1, 1937 |

UNITED STATES PATENT OFFICE
CERTIFICATE OF CORRECTION

Patent No. 3,082,040            March 19, 1963

Howard P. Degerness

It is hereby certified that error appears in the above numbered patent requiring correction and that the said Letters Patent should read as corrected below.

Column 3, lines 62 and 63, for "for receiving the outer side edge of said cylin-wall," read -- fitting in said annular seat and said cylindrical wall, --; line 65, for "teh" read -- the --.

Signed and sealed this 3rd day of November 1963.

(SEAL)
Attest:
ERNEST W. SWIDER

Attesting Officer

EDWIN L. REYNOLDS

Acting Commissioner of Patents